(No Model.)
J. A. BIRKHOLZ.
LOCK FOR THE WHEELS OF CHILDREN'S CARRIAGES.
No. 484,873. Patented Oct. 25, 1892.
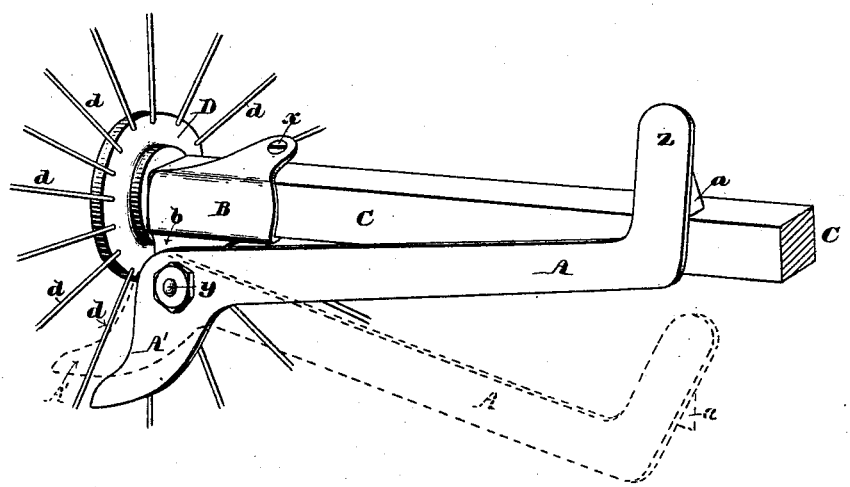
Witnesses:
Inventor:

UNITED STATES PATENT OFFICE.

JOSEPH A. BIRKHOLZ, OF RACINE, WISCONSIN.

LOCK FOR THE WHEELS OF CHILDREN'S CARRIAGES.

SPECIFICATION forming part of Letters Patent No. 484,873, dated October 25, 1892.

Application filed April 25, 1892. Serial No. 430,652. (No model.)

*To all whom it may concern:*

Be it known that I, JOSEPH A. BIRKHOLZ, a citizen of the United States, residing at Racine, in the county of Racine and State of Wisconsin, have invented a new and useful Brake or Lock Attachment to Baby-Carriages and Like Small Vehicles, of which the following is a specification.

My invention relates to improvements in wheel-locking devices for small vehicles, (especially where the wheels and axles are metallic,) by which the wheel can be locked and prevented from turning by a catch inserted between the spokes by means of a bar and pawl operated by the foot of the person propelling the vehicle, and again by the foot brought to rest on the axle; and the objects of my improvement are the reduced cost and the simplicity of working of the device.

The accompanying drawing shows my device attached to the axle of a carriage.

The bar A, with its pawl or catch end A' and vertically-bent pedal $z$ and catch $a$, is all cast or made in one piece, of proper size and proportions relative to the axle and wheel, as shown in the drawing. This bar is pivoted or hinged at $y$, near the vehicle-hub, to the hanger $b$. This hanger is part of and dropped from the clip B, which is attached to the axle C by means of bolt $x$ or other similar device.

The bar A A' $z$ when disengaged is held in place and supported by the front edge of the top of the axle C by means of the catch or notch $a$. When the carriage is stopped, the pressure of the propeller's toes against the pedal $z$ throws the bar off the axle, when by its own gravity it drops and engages the catch or pawl end A' with or between the spokes $d\ d$ of the wheel D, as shown in the drawing by the dotted outlines of the bar, similarly lettered.

I do not claim, broadly, a brake or lock for baby-carriages or like small vehicles; but

I claim as my invention—

The metal bar A A', provided at its inner end with pedal $z$ and catch or notch $a$, in combination with the carriage-axle $c$, the wheel-spokes $d\ d$ D, and clip and hanger B $b$, as shown and described.

J. A. BIRKHOLZ.

Witnesses:
 F. F. DUFF,
 ED. P. BRENNAN.